United States Patent
Ott et al.

(10) Patent No.: US 6,326,790 B1
(45) Date of Patent: Dec. 4, 2001

(54) GROUND PIERCING METAL DETECTOR HAVING RANGE, BEARING AND METAL-TYPE DISCRIMINATION

(76) Inventors: Ellen Ott; James H. Ott, both of 583 Timberline Dr., Akron, OH (US) 44333

( * ) Notice: Subject to any disclaimer, the term of this patent is extended or adjusted under 35 U.S.C. 154(b) by 0 days.

(21) Appl. No.: 09/366,805

(22) Filed: Aug. 4, 1999

(51) Int. Cl.$^7$ .............................. G01V 3/11; G01V 3/165
(52) U.S. Cl. ....................... 324/327; 324/236; 324/239; 324/329
(58) Field of Search ................................. 324/326–329, 324/67, 236, 239, 654–657; 175/19, 50

(56) References Cited

U.S. PATENT DOCUMENTS

| | | | |
|---|---|---|---|
| 3,315,155 | * | 4/1967 | Colani .................................. 324/239 |
| 3,714,563 | * | 1/1973 | Voll .................................. 324/327 X |
| 3,742,341 | * | 6/1973 | Clowes et al. ..................... 324/67 X |
| 3,907,136 | * | 9/1975 | Christides et al. ................. 324/67 X |
| 4,024,468 | * | 5/1977 | Hirschi ................................ 324/329 |
| 5,554,934 | * | 9/1996 | Ward et al. ......................... 324/326 |
| 5,644,237 | * | 7/1997 | Eslambolchi et al. .............. 324/326 |
| 5,680,048 | * | 10/1997 | Wollny ................................ 324/329 |
| 5,798,644 | * | 8/1998 | Eslambolchi et al. .............. 324/326 |

OTHER PUBLICATIONS

Corbyn, J.A.; Pulse Induction Metal Detector, Wireless World vol. 86, No. 1531, pp. 40–41 Mar. 1980.*

* cited by examiner

Primary Examiner—Gerard R. Strecker
(74) Attorney, Agent, or Firm—Frank H. Foster; Kremblas, Foster, Phillips & Pollick

(57) ABSTRACT

A hand tool has a handgrip attached to a ground-piercing probe, which is manually insertable in the soil. The probe has a chamber in which at least one inductor is positioned and connected to metal detection circuitry. The preferred circuitry has a pulse generator applying current pulses to an inductor for inducing eddy currents in a buried target object. After the pulse terminates, the decaying coil voltage is sampled at different times to detect both the presence and range of the object, as well as the type of metal in the object. An asymmetric magnetic field pattern about the probe is aligned with a direction pointing indicium on the handgrip and provides directional sensitivity. The coil voltage samples are applied to signaling circuitry, which provides an audible signal which is a series of bursts of an audio tone. The pitch of the audio tone signals the presence, range and bearing of the buried metal object, while the pulse rate of the bursts signals the metal type.

33 Claims, 9 Drawing Sheets

GROUND PIERCING METAL DETECTOR HAVING RANGE, BEARING AND METAL-TYPE DISCRIMINATION

CROSS-REFERENCES TO RELATED APPLICATIONS (Not Applicable)

STATEMENT REGARDING FEDERALLY-SPONSORED RESEARCH AND DEVELOPMENT (Not Applicable)

BACKGROUND OF THE INVENTION

1. Field of the Invention

This invention relates generally to metal detectors for detecting buried metal objects and more particularly relates to a metal detector using a ground piercing probe and associated electronic circuitry and methods for detecting not only the range of buried metal objects, but also the bearing and metal type of the buried metal object.

2. Description of the Related Art

Metal detectors have long been used by hobbyists as a favorable form of recreation, which offers not only an enjoyable activity, but also the opportunity to discover valuable and/or historical metal target objects buried in the soil.

In conventional prior art metal detecting, a user laterally reciprocates a metal detector, usually including a coil or other inductor, above a soil surface in a scanning pattern seeking an audible signal which indicates the presence, under the soil surface, of a metal object. The soil in which such buried metal objects are sought includes not only dirt and sand, and other manually movable or deformable earth surface materials, which are readily accessible to humans, but also includes underwater lake and sea bottoms.

A commonly used signal which indicates the presence of a metal object is an increase in the frequency of an audible tone. The typical user reciprocates the inductor of the typical metal detector above the surface in repetitive left and right, arcuate reciprocating movements until the frequency increase is heard or a tone is heard. Upon hearing a frequency increase, the user then begins reciprocating the inductor in smaller arcs across the region where the increased frequency signal was detected in an attempt to more precisely determine a position vertically above the buried metal object.

When permitted, a shovel is then used to dig up a clump of soil and the user then breaks apart and sifts through the clump using the user's fingers or a tool in an attempt to find the metal target object. If the user is fortunate, the target object will be found in the clump of soil which has been dug up. Unfortunately, conventional metal detectors often cannot sufficiently accurately pinpoint the location of the buried metal object. Therefore, the metal detector is again employed and additional clumps of soil must be similarly dug up, sifted through and inspected. Also, the buried metal object may be located below the depth of the initial dig, necessitating deeper digging to retrieve the objects. Consequently, conventional metal detecting typically requires extensive manual labor for removing clumps of soil, breaking them apart and sifting through them.

After completing these activities, a conscientious metal detector user will then carefully replace the soil in an attempt to return the soil as nearly as possible to its original condition. However, some users do not exercise such care, merely leaving a hole in the soil. Even users who carefully replace the soil have nonetheless created and left behind a substantial environmental disturbance in the soil.

These soil disturbances, especially at popular historical sites and highly trafficked outdoor public or park areas, often cumulatively cause both significant damage to the visual, cosmetic appearance of such areas as well as destruction of vegetation or other components of the local ecosystem and the creation of safety hazards.

As a result, many owners of private land and operators of public parks have imposed digging restrictions and regulations to minimize such damage or destruction. Typically, these restrictions limit the metal detector operator to digging in the soil with a tool no larger than a screwdriver and to digging only small holes to retrieve a metal target object. Because conventional metal detectors are insufficiently accurate to allow the target metal object to be located within a distance range tolerance of such a small hole, the operators use a probe, such as an ice pick or a screwdriver, to pierce the ground in the vicinity of the detected object in an attempt to strike the object and feel its presence. Such ground piercing does not cause significant soil disturbance and often is beneficial in providing aeration for trees or other vegetation. However, one problem with this technique is that it is a trial and error process which usually requires numerous ground piercings because such a probe only has a detection width equal to its own very narrow width. An additional problem is that such a probe and pierce technique does not enable the user to distinguish between the detected metal object and a nearby stone, tree root or other buried object which is harder than the surrounding soil. Consequently, small digs resulting in retrieval of only a stone or exposure or damage to a tree root, often occur. Furthermore, if an initial small hole has been dug and the object is not found, the problem remains for the user to determine in which direction from the hole the buried target object lies.

In an attempt to overcome the inherent inaccuracy of the conventional metal detector, the prior art has provided miniaturized metal detectors. These are of the same type as and modeled after the larger conventional metal detectors, but are much smaller. They are typically larger than ½" in diameter, have a plastic outer sleeve or shaft and use conventional metal detection circuitry. These miniature versions of conventional metal detectors are used to search for buried metal objects near the walls of a hole the user has dug or in dirt the user has dug out to form the hole and is sifting through.

There is therefore a need for a hand tool and associated electronic circuitry and methods to more precisely locate the buried metal target object after the general vicinity of its location has been detected by a conventional metal detector.

An object and feature of the present invention is that, after the general vicinity of a buried metal target object has been located by a conventional metal detector and before any holes have been dug, embodiments of the invention permit the location of the object to be more precisely detected, utilizing considerably fewer soil piercings without significant disturbance of the soil.

Another object and feature of the invention is to provide a metal detecting hand tool having a probe with sufficient strength, hardness and toughness so that it can survive repetitive insertions into undisturbed soil, especially hard soils and abrasive soils, such as sand.

A further object and feature of the invention is that each time the soil is pierced by the probe of the invention, the bearing of the object may be detected to guide the user toward the next most appropriate place to again pierce the ground, thus greatly improving the probability that the metal object will be struck by the next ground piercing.

A further object and feature of the invention is to detect not only the range and bearing to the buried metal object, but to detect information about the type of metal in that object. This permits the user to discontinue the effort to retrieve the metal object if the user is not interested in objects of the detected metal type and also permits the user to spend more time being more persistent if a potentially valuable metal is detected.

BRIEF SUMMARY OF THE INVENTION

The invention is an improved hand tool for detecting buried metal objects. The hand tool has a handgrip attached to a ground-piercing probe, which is manually insertable in the soil to displace the soil radially outwardly from the probe. An improvement of the invention is a chamber in the probe and at least one inductor positioned in that chamber and connected to metal detection circuitry. The invention includes other features, such as the provision of an asymmetrically shaped magnetic field pattern about the probe for providing directional sensitivity and the use of particular materials in the probe.

The invention further is directed to a method for detecting the location of a buried metal target object. The method is initiated by plunging the probe of a tool embodying the invention a distance into the soil to displace the soil outwardly from the probe and position the chamber below the surface of the soil. Eddy currents are then induced in the target object by generating a time changing magnetic field about the coil located in the chamber. Current induced in the coil by the eddy currents is then detected to determine the presence and/or range of the metal object and, if certain additional features of the invention are utilized, the bearing and metal type of the target object.

The invention further is a metal detection circuit for detecting the type of metal in the buried metal object. The circuit provides a signal to the user which indicates whether the metal is a ferrous metal, such as iron or steel, a high conductivity metal, such as pure gold, a silver coin or a copper coin, or a medium conductivity metal, such as aluminum alloys or gold alloys commonly used for jewelry. The metal detection circuit has a pulse generator connected to a coil for generating a time changing magnetic field in response to electrical pulses applied to the coil. A resistive energy damper is coupled to the coil for attenuating the energy in the magnetic field in a manner which extends the decay of the current in the coil after termination of the pulse. A sampling and storing circuit is connected to the coil for sampling a signal representing the magnitude of the coil current at a sampling time. Preferably coil voltage is sampled in order to detect the coil current at the sampling time because voltage and current are related by ohms law and are therefore interchangeable signals. Consequently, most qualitative observations made about coil current are also applicable to coil voltage. The sampling time for detecting metal type is within a time interval beginning after termination of the pulse from the pulse generator and ending before the time at which the coil current in the presence of a high conductivity metal target object decays to a current which exceeds the current to which the coil current decays in the absence of a metal target object. A signaling circuit is connected to the output of the sampling and storing circuit for signaling changes in the detected coil current as the coil is moved. In particular, the signaling circuit signals whether the coil current increases, decreases or remains substantially the same. The direction of change or the lack of change in the coil current as the coil is moved may then be interpreted by the user, or a suitably programmed computer, as an indication of the type of metal in the buried metal object.

The invention further is a method for detecting the metal type of a metal target object buried below the surface of a soil. The method begins by attempting to induce eddy currents in a target object by applying a current pulse to a coil which is coupled to a damping load. The current induced in a coil by the eddy currents is detected at a first sampling time. The first sampling time is located within a time interval beginning after termination of the current pulse applied to the coil. The time interval ends before the time at which the coil current, in the presence of a high conductivity metal object, decays to a current which exceeds the current to which the coil decays in the absence of a metal target object. Changes in the detected coil current are monitored and signaled as the probe is moved. These signaled changes in the coil current sample magnitude as the coil is moved closer to the metal object are then interpreted by the user to determine the type of metal object buried beneath the soil.

Figure 1:
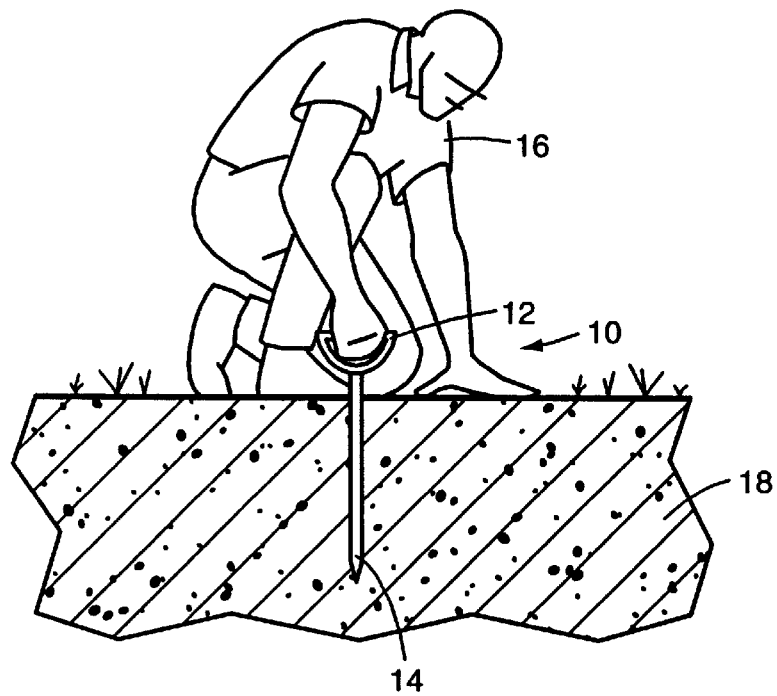
FIG. 1 is a pictorial view illustrating the use of an embodiment of the invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art. In addition, many circuits are illustrated which are of a type which perform well-known operations on electronic signals. Those skilled in the art will recognize that there are many, and in the future may be additional, alternative circuits which are recognized as equivalent because they provide the same operations on the signals. Further, those skilled in the art will recognize that, under well-known principles of Boolean logic, logic levels and logic functions may be inverted to obtain identical or equivalent results. Similarly, there are currently various materials existing, and are likely to be additional materials developed in the future, which exhibit the characteristics described herein, making them useful in embodiments of the invention.

DETAILED DESCRIPTION OF THE INVENTION

Figure 2:
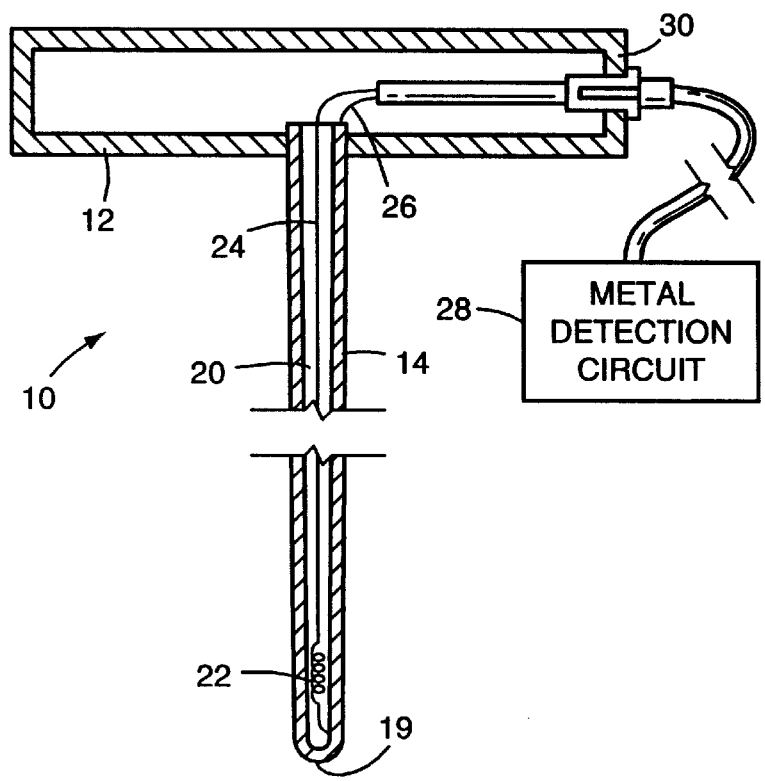
FIG. 2 is a view in vertical section of an embodiment of the invention.

Referring to FIGS. 1 and 2, the hand tool 10 of the present invention has a handgrip 12 attached to a ground-piercing probe 14. The probe 14 extends perpendicularly from a central portion of the handgrip 12. The handgrip extends in opposite directions from an end of the probe to provide a t-shaped hand tool, so that the handgrip can be comfortably gripped by the hand of a user 16 and manually thrust into the soil 18. When inserted in the soil 18, the probe 14 causes the soil 18 to be displaced a small distance radially outwardly from the probe 14. The end 19 of the probe 14 is preferably rounded and most preferably hemispherical to facilitate its insertion into the soil and to provide strength and durability.

The probe 14 is preferably tubular, so that it is provided with an interior chamber 20. Alternatively, the chamber 20 may be formed as a groove, notch or cavity in the probe 14, but the tubular shape is preferred because such a cavity within the tube provides both a chamber in which an inductor 22 may be mounted and through which a wire 24 may easily extend into connection with one terminal of the inductor 22. As will be described below, the probe 14 can be made of a variety of materials and if the probe 14 is a metal, the other terminal of the inductor 22 may be connected directly to the metal probe 14, which is in turn connected to a wire 26. The wires 24 and 26 connect the inductor 22 to a metal detection circuit 28. If the probe 14 is a nonconductive material, the wire 26 also extends into the chamber into connection with the other terminal of the inductor 22. Preferably, the wires 24 and 26 extend from the interior, central portion of the handgrip 12, out through the end 30 of the handgrip 12 and they are sufficiently long that the metal detection circuit 28 can be conveniently, releasably mounted to the belt, or other clothing article, on the user 16 or self-contained and hand-carried.

Figure 3:
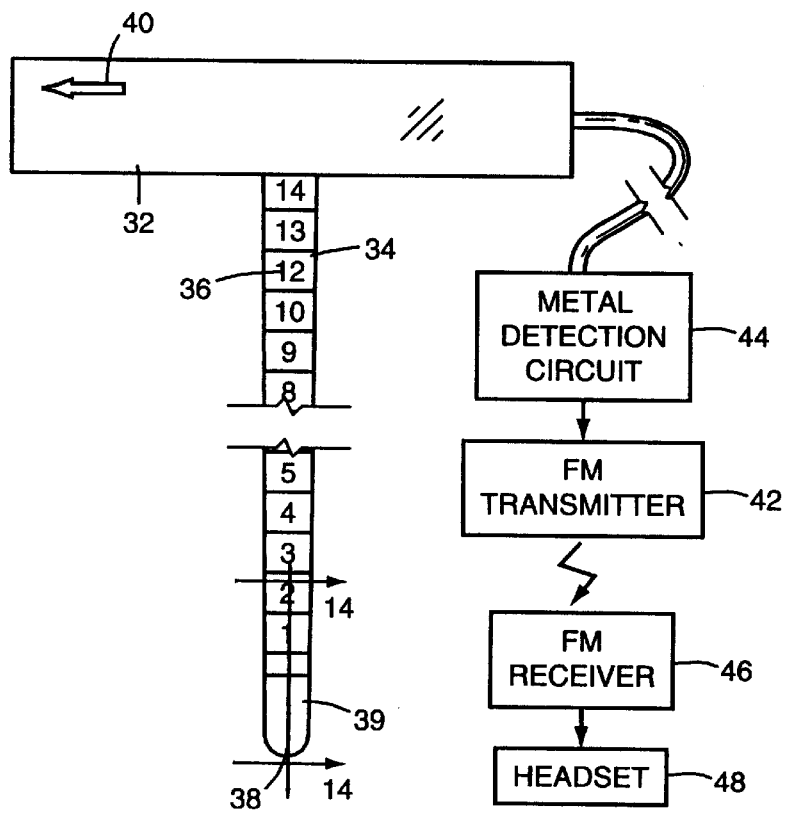
FIG. 3 is a view in side elevation of an alternative embodiment of the invention.

FIG. 3 illustrates some alternative features of a hand tool embodying the present invention. FIG. 3 shows a hand tool having a handgrip 32 and a probe 34 with length graduations 36 together with numerals indicating length dimensions spaced along the probe 34, with reference to the rounded tip 38 of the probe 34. This allows a user to determine the depth of an object which is struck by the probe. The user can then choose the most effective tool for extracting the target object. The graduations also provide an indication of the depth of an object which is not struck, but is detected by the electronic circuitry in a manner subsequently described as being located horizontally from the inserted probe.

As will be described below, the tool can also have a directional sensitivity in a plane which is perpendicular to the axis of the probe 14 or 34, as a result of providing a radially asymmetric field pattern around the inductor 22. Consequently, it is also desirable to provide a direction pointing indicium, such as an arrow 40 on the handle 32, indicating the direction of maximum sensitivity, which is the direction of the major lobe of the field pattern. This indicium, of course, can alternatively consist of a dot or other geometric figure placed at one end of the handle, a different coloration or other indicium to indicate the direction of maximum radial sensitivity.

Figure 14:
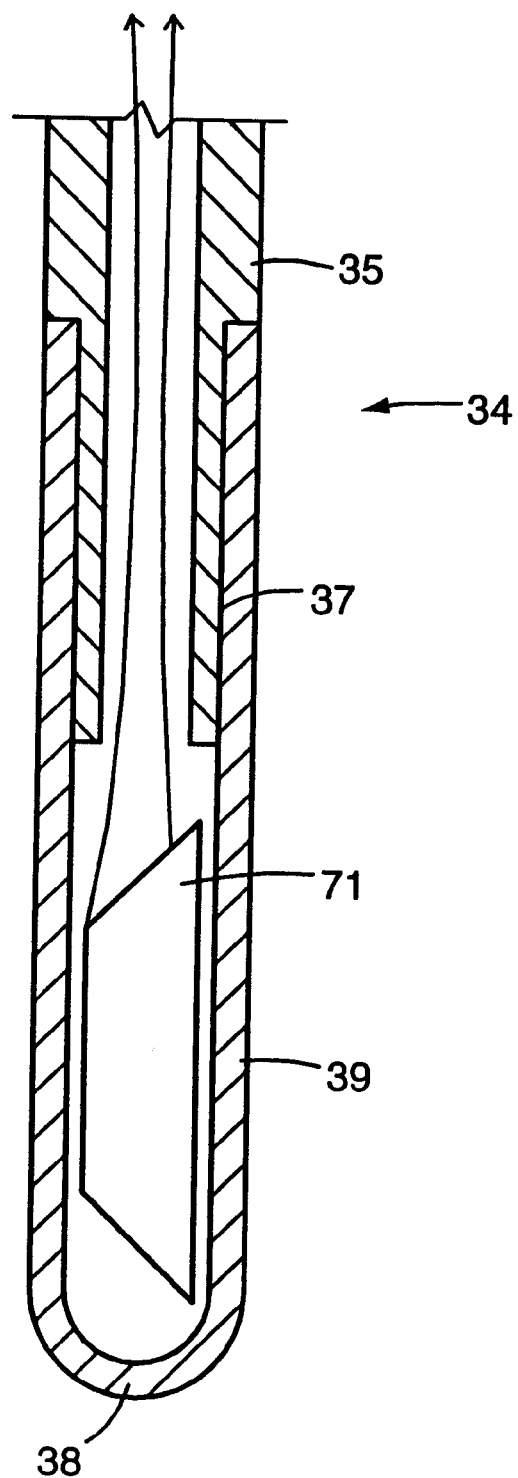
FIG. 14 is a view in axial section taken substantially along the lines 14–14 of FIG. 3.

Certain dimensional features and material characteristics of the invention are particularly desirable and preferred. The diameter of the probe 14 or 34 should be less than about ⅜" because it is too difficult or impossible to manually force the probe into many soils if it is any larger. Preferably, a tubular probe has an outside diameter of substantially 7/32" or 0.226", which are equivalent. The preferred probe 34 has two component parts illustrated in FIG. 3 and in more detail in FIG. 14. One component is a #304 stainless steel tube 35 having an outside diameter of 0.226", an inside diameter of 0.080" and a length of 12.5". The stainless tube 35 is telescopically interfit into and bonded to a second tip component along an annular shoulder segment 37 which is 0.50" in axial length. The tip component is a tubular zirconia tip 39 which has a cylindrical portion 1.5" long with an outside diameter of 7/32" and an inside diameter of 0.145" and a hemispherical tip to provide an overall probe length of 14". A longer zirconia tip is weaker and a shorter zirconia tip is insufficiently long to both contain a coil and fit over the stainless tube. Other materials would also make desirable tips. For example, the tip may be constructed of a metal oxide, such as sapphire, or a glass or ceramic.

Most conventional metal detection circuits, as well as the preferred metal detection circuit of the present invention, include a headset connected by a wire to the main circuitry of the metal detection circuit to enable the user to hear an audio signal generated by the metal detection circuitry. Sometimes audio speakers are also provided for alternative use. Alternatively, however, an FM transmitter 42 may be connected in the principal metal detection circuitry 44 for modulating the audio signal generated by the metal detection circuitry 44 and transmitting that signal to an FM receiver 46, mounted to the headset 48 and electrically connected to its sound transducers. Of course, other types of modulation may be used.

As a further alternative, the metal detection circuitry may be miniaturized and mounted within the handgrip 12 or 32 of the present invention, including the FM transmitter, to entirely eliminate the need for a wire extending out of the handgrip 12 or 32 to a remotely mounted metal detection circuit.

Popular, prior art metal detection circuits utilize an inductor, usually in the form of a coil. The hand tool of the present invention illustrated in FIGS. 1–3, can be used with these prior art metal detection circuits with the appropriate selection of probe materials and the coil. Preferably, however, the probe is used with the modified pulse induction detection circuitry, illustrated in the Figures and described below.

The prior art circuits, as well as the circuit of the present invention, detect the presence of a buried metal object by inducing eddy currents in a buried metal object by means of a time varying current in a coil. The frequency of the coil current is sufficiently high to provide acceptable coupling and a sufficiently low frequency to provide adequate soil penetration. The typical frequency of operation is 5KHz.

One type of prior art metal detection system uses detuning of an oscillator as a result of inductive coupling between an inductor and a buried metal object. One embodiment of this system has a pair of oscillators, referred to as beat frequency oscillators. One oscillator is operated at a fixed frequency. The other oscillator is tuned to substantially the same frequency, but includes a coil, which is the search coil. In embodiments of the invention, the coil 22 in FIG. 2 may be used as such a search coil. The outputs of these two oscillators are mixed to detect a difference audio frequency which provides an output, audio tone. As the search coil is brought into proximity with a buried metal object, the second oscillator is detuned in proportion to the search coil's coupling to the buried metal object. Consequently, changes in the pitch of the audio output tone signal the presence and range of the buried metal object. As the range decreases, the mutual inductive coupling is increased causing the oscillator to be further detuned and therefore raising the audio pitch.

Another variation of the oscillator detuning principle utilizes a single oscillator connected to the coil, such as the inductor 22. The oscillator has a conventional audio frequency control negative feedback loop, having a signal which varies in magnitude in proportion to detuning of the oscillator by coupling of the coil to a buried metal object. The magnitude variations of the AFC loop are used to control a voltage controlled oscillator, oscillating at an audio frequency, with the result that the frequency of the audio output tone is varied as the coil is brought into proximity with the buried metal object.

The coil 22 in embodiments of the invention may be used as the sensing coil with both of these circuits embodying the detuning principle, although this is not preferred.

A second type of prior art metal detection circuit uses the induction balance principle. With such a circuit, two coils are orthogonally positioned to provide a null condition; that is so that there is no electromagnetic coupling between the coils. One coil transmits to the buried object at an oscillator frequency, while the other is used for receiving a signal from the eddy currents induced in the object. When no metal object is present and consequently there is no metal object in which eddy currents are generated, little or no signal is received by the receiving coil. However, the presence of a metal object in proximity to the coils allows the eddy currents generated in the metal object to be transmitted back to and received by the receiving coil and detected by the metal detection circuitry. The magnitude of this received signal, coupled from the transmitting coil to the metal object and then from the metal object back to the receiving coil, is applied to a signaling circuit, typically an audio oscillator, to vary the audio tone in proportion to the magnitude of the received signal. This magnitude indicates the presence and range of the buried metal object. The coils of an induction balance detection system may also be mounted in the probe 14 or 34 using the present invention, although this is not preferred.

Both of the above described prior art metal detection systems, when they are utilized with the structure of the present invention, require that the probe be formed of a non-metallic or dielectric material so that eddy currents are not generated in the probe itself. Suitable materials include a relatively hard, durable plastic material, a composite such as a carbon fiber/epoxy composite, or a ceramic material, such as zirconia. The probe can also be constructed with multiple sections of different material, such as metal tube having a zirconia or other ceramic tip portion 39, illustrated in FIG. 3. This ceramic tip construction is also particularly desirable in preferred embodiments of the invention.

The third type of metal detection circuitry known in the prior art uses pulse induction detection. That system ordinarily utilizes a single coil for both transmitting and receiving although some embodiments utilize two coils, one for transmitting and a different one for receiving. In the pulse induction detection circuitry, a pulse is applied to a coil with a sharp cutoff to provide a step function which, as known to those skilled in the art, produces high frequencies. Thus, by pulsing the coil, a time changing magnetic field is generated about the coil, which induces eddy currents in a metal target object. These eddy currents are then coupled back to either the same coil or a second receiving coil and the received signal is detected and applied to a signaling circuit. Since the magnitude of the received signal is a function of the distance to a buried metal object, the signaling circuit signals changes in received signal magnitude to indicate the presence and range of the metal target. The present invention with the coil 22, illustrated in FIG. 2, may be utilized with prior art pulse induction detection circuitry. A second coil may be mounted in the probe 14 for use with pulse induction circuits utilizing two coils.

Figure 7:
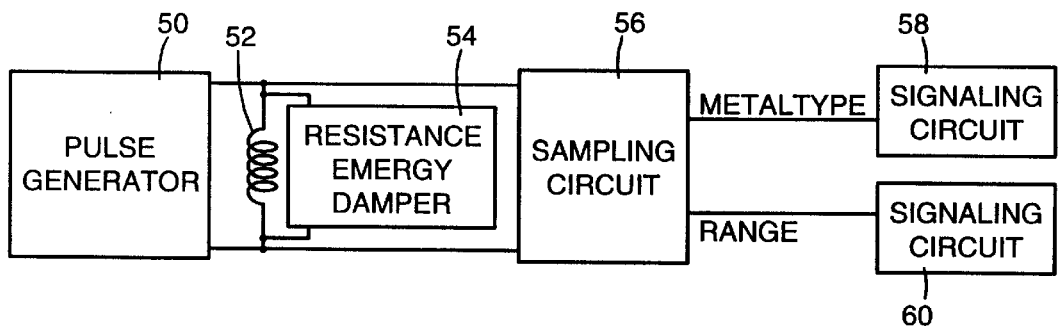
FIG. 7 is a block diagram illustrating the fundamental principles of the present invention.
Figure 8:
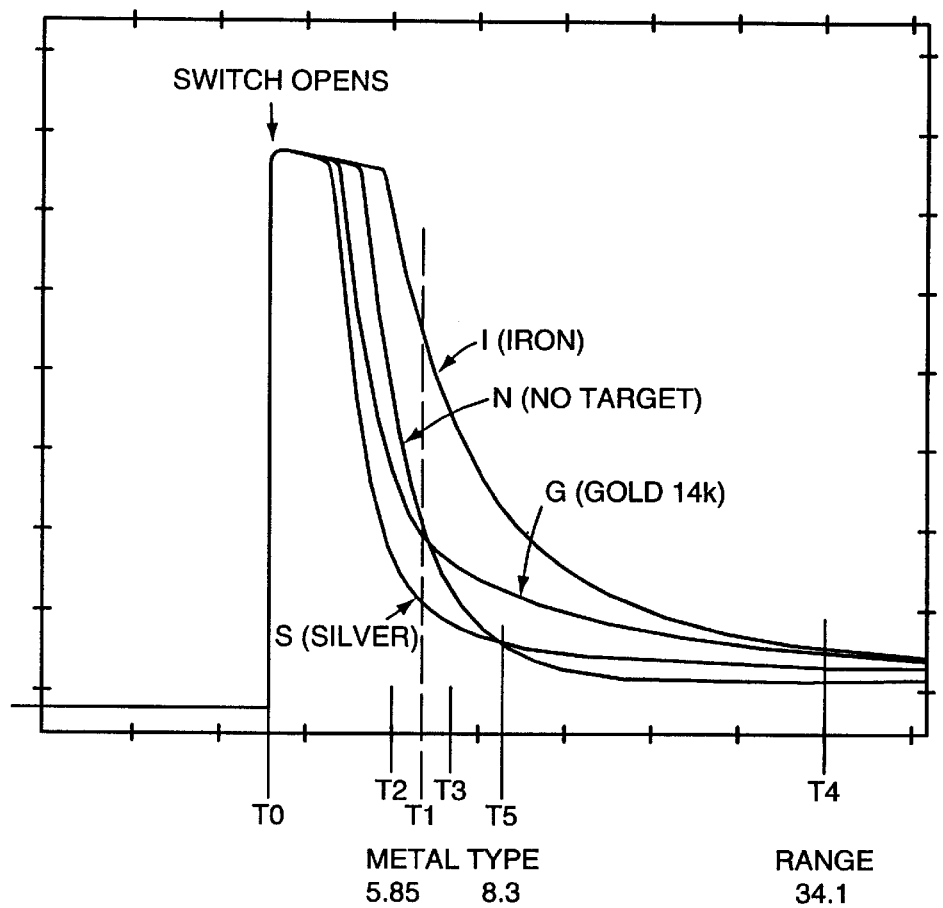
FIG. 8 is an oscillogram illustrating the principles of operation of the present invention.

FIG. 7 is a simplified block circuit diagram illustrating the fundamental principles of the present invention and FIG. 8 illustrates the operation of that circuit. FIG. 7 uses the pulse induction system and therefore has a pulse generator 50, which applies periodic pulses to inductor 52. The term "inductor" is used to indicate an electronic component which exhibits an inductance. The term includes a coil with no core material as well as a coil with a core. As is known in the art, separate transmitting and receiving inductors may be used, but are not preferred because the circuit is more simplified by elimination of one inductor.

The pulses applied to the inductor 52 may, for example, be applied to the inductor 52 at a 120 Hz rate, with a pulse width of, for example 150 microseconds, for driving the inductor 52 at a current of, for example, 1 amp. The choice of pulse rate results from an engineering tradeoff between an increase in power consumption and coil heating as frequency is increased and a decrease in sensitivity as the frequency is decreased.

A resistive energy damper 54 is coupled to the inductor 52 either by direct conductive connection or by inductive coupling. The resistive energy damper 54 may be a resistor or a resistive network connected in shunt across the inductor 52. Alternatively, the energy damper may be a nonferrous, high resistivity metal inductively coupled to the inductor 52, such as a metal used to construct the probe of the present invention.

A sampling circuit 56 is connected to the inductor 52 for sampling the coil voltage or current at selected sampling times subsequent to the termination of the pulse from the pulse generator 50. Signals representing the magnitude of the samples are then applied to signaling circuits 58 and 60.

As illustrated in FIG. 8, the pulse terminates at time T0, after which the voltage across the inductor 52 decays exponentially at a rate which is dependent upon the resistive energy damper, the presence or absence of a buried target object, its range and the type of metal of which the target object is constructed. FIG. 8 is a family of oscillograms of exponentially decaying coil voltages for representative metals and for the absence of a metal target. The metals represent ferrous metals, high conductivity metals and mid-range conductivity metals. This family of oscillograms has the characteristic that there is an initial region of exponential decay having a duration of several time constants during which most of the decay of this family of curves occurs. This is followed by a region of slower decay rate.

FIG. 8 is a drawing of actual oscillograms. In the circuit from which these oscillograms were derived, the voltage pulse is clamped by a 15 volt zener diode to protect the input of an op-amp from a 200 volt spike. Consequently, the coil current, when the coil voltage exceeds 15 volts, is shunted through the zener diode. Because of the clamping diode, during the initial, relatively flat voltage segment of the oscillogram, the coil current is exponential but the voltage is not. This early region of shunted coil current is not used by the circuit as a signal.

One important characteristic of this family of curves is that after several time constants, the curve N, which represents the decay in the absence of a metal target, decays to the lowest value of any of the decaying curves. That is because there are no eddy currents induced in a buried metal object to store energy and couple energy back to the metal detector circuit. In this region to the right of the knee of these curves, samples are taken to determine whether a metal object is present and its range. For example, in the present invention samples are taken at time T4, which is preferably 34.1 microseconds after time T0, the time of termination of the pulse applied to the inductor 52. The sample duration is preferably 1 microsecond. Samples taken at this later time interval are applied to signaling circuit 60 for indicating target presence and range. As in prior art circuits, the magnitude of the signals coupled from the eddy currents induced in the buried metal object back to the receiving coil are an inverse function of the range to the metal object.

The reason that the inductor current takes longer to decay in the presence of a metal object and therefore has a higher magnitude at sample time T4 is that energy is coupled to a metal object and generates eddy currents. These eddy currents generate magnetic fields in which energy is stored. Therefore, the pulse applied to the pulse generator causes more energy to be stored in the system in the presence of a metal object, than in the absence of a metal object. Consequently, the decay time is longer in the presence of a metal object.

At sampling time T4, although all decaying oscillograms which represent metal objects are greater than the oscillogram N representing the absence of a target metal object, there is only a small difference between them. Consequently, samples taken in this later region are difficult to use for distinguishing between the type of metal detected. However, since the magnitude of samples, taken beyond the knee of the curve at time T4, vary inversely to the range of a metal object, samples taken at this later time are used to determine the presence and range of a buried metal object.

The signaling circuit 60 therefore signals to the user changes or lack of changes in the magnitude of the samples taken, for example at time T4, as the inductor 52 is moved nearer or further from a buried metal object. These changes may be signaled, for example, by varying the tone of an audio oscillator in proportion to the magnitude of those samples, or by other signaling means, such as a numerical display, a meter, a light which varies in intensity, or other signaling circuitry or devices.

Another important characteristic of the decay oscillograms illustrated in FIG. 8 is the subject of the present invention. The rate of decay of the voltage across the inductor 52 during the first few time constants of decay is also dependent upon the type of metal in the buried metal object. At times preceding the knee of the oscillograms, the decaying voltage for the different metals exhibit more substantial differences in magnitude than after the knee. Therefore, samples can be taken at a selected time in this earlier portion of the decay and used to discriminate between different kinds of metals.

In order to provide a time interval which is sufficiently long to allow samples to be taken for detecting metal type, the time rate of decay must be reduced (i.e. the decay time extended) from that in prior art pulse induction systems. In the prior art pulse induction systems, the initial decay is so rapid that meaningful samples cannot be taken.

In the present invention, the decay rate is reduced (i.e. the decay time and time constant are increased) by providing the resistive energy damper 54. Whether the resistive energy damper is a resistor, network of resistors or other resistance, or is a nonferrous, low conductivity metal forming the probe, the effect of the resistive energy damper is to reduce the decay rate and thus extend the time interval in which samples may be taken to determine the type of metal. The resistive energy damper reduces the rate of decay because the time constant for a resistive/inductive circuit is L/R. Consequently, the time constant is inversely proportional to the resistance of the energy damper, if the energy damper is a resistance connected across the inductor 52.

The use of a nonferrous metal probe, instead of a resistance connected across the inductor, has a similar effect in reducing the rate of decay and thereby extending the time interval before the knee of the curves, during which samples can be taken for detecting metal type. However, the nonferrous metal probe should be a relatively high resistance (low conductivity) metal to avoid extending the decay time of the eddy currents in the metal probe beyond the time it takes for eddy currents in a metal target object to decay. The extension of the decay time occurs because energy is stored in the magnetic field of the eddy currents induced in the nonferrous metal probe material, prolonging the decay time because more energy is stored in the coupled system. The system can also be considered as analogous to a transformer in which the secondary impedance reflected into the primary is inversely proportional to the value of the secondary impedance. Therefore, the high secondary resistance represented by the low conductivity metal reflects as a low resistance into the coil to increase the circuit's time constant.

Another important characteristic of the decay oscillograms of FIG. 8 is that the oscillogram I for iron and other ferrous materials has a decay rate which is substantially less than the decay rate N for no target. The reason ferrous metals extend the decay time is because of their high permeability thus increasing the inductance of the coupled circuit. The increased inductance means more energy stored and therefore a longer time delay for dissipating that energy.

Yet another important characteristic of the decay oscillograms is that the decay oscillogram S for the high conductivity metals, such as silver, pure gold and copper, exhibits a substantially more rapid rate of decay than the decay rate for oscillogram N for no target. This may be explained as the reflection of the low resistance of the high conductivity target into the coil as a high resistance, thus reducing the time constant L/R. It may also be explained by observing that eddy currents reflect a back emf into the coil, which opposes coil current. This mutual coupling reduces the apparent inductance of the coil. Because the eddy currents in a high conductivity metal take longer to dissipate (because of the lower resistance) the back emf induced in the coil by the eddy currents is greater for a longer time interval than for metals of lesser conductivity. High conductivity metals have an effect opposite the effect of ferrous metals because they reduce the apparent inductance of the coil mutually coupled with the metal object more than metals of less conductivity. Metals of intermediate conductivity, such as 14 karat gold, an alloy commonly used in jewelry and plotted in FIG. 8 as oscillogram G, or aluminum alloy decay at an intermediate rate between the decay rates for the high conductivity metals and the ferrous metals.

Consequently, as the inductor 52 is moved from a position remote from a buried metal object, at which there is essentially no coupling to the object, toward the buried metal object, samples taken in this early interval, for example at time T1, will increase in magnitude if the metal is ferrous, decrease in magnitude if the metal is one of high conductivity, such as pure gold or silver, and not change much in the presence of a jewelry gold metal object. Although the intermediate conductivity metal object sample magnitude will not change much as the object is approached by the metal detector, the samples at time T4, which indicate range, will increase as that object is approached, thereby signaling that a metal object is being approached.

The signaling circuit 58 may be provided with a signal representing the magnitude of samples taken at time T1 and signals changes in that sampling magnitude. Consequently, the user will be aware that a metal object is present by a variation in the signal from the range signaling circuit 60 and, knowing that, the user will be able to determine the nature of that metal object by the changes, or lack of changes, in the signal from the metal type signaling circuit 58.

The time interval in which the sampling is done to detect the type of metal in the buried object may be seen with reference to FIG. 8. After several time constants, the decaying oscillograms for all metals are greater than the decaying oscillogram for no target N. The decay oscillograms for high conductivity and medium conductivity metals initially follow a path to the left of the oscillogram N and eventually intersect it. The decay oscillogram for ferrous metals remains to the right of the oscillogram N. It is therefore necessary that samples taken for the purpose of detecting the type of metal must be taken before the high conductivity metal oscillograms intersect the no target oscillogram N at time T5. Therefore, the sampling time for obtaining a sample to detect the nature of the metal must occur within a time interval beginning after termination of the pulse at time T0. That time interval ends before the time at which the inductor current in the presence of a high conductivity metal object decays to a current which exceeds the current to which the inductor current decays in the absence of a metal target object; i.e. before time T5 in FIG. 8.

An ideal time position within that time interval to sample the coil decay voltage would appear to be time T1, which, in the embodiment tested, is approximately 7 microseconds after T0. The time T1 is preferred because it is the time of intersection between the no target oscillogram N and the oscillogram G for 14K gold. By utilizing the sampling time T1, samples for 14K gold would not vary in magnitude from samples taken for a no target condition and this lack of change would signal to the user that the target being detected by the range sample at time T4 may be a 14K gold target. The exact time T1 at which the gold oscillogram G and the no target oscillogram N intersect is a function of circuit values, including the resistive energy damper 54 and the inductance of the inductor 52. Therefore, different sampling times will be used with different specific circuits embodying the present invention.

Although the circuit operates well by taking a single sample at time T1 within the time interval between T0 and T5, experimental usage of such an embodiment of the invention has indicated that it is sometimes difficult to precisely locate the sample time T1 at the exact intersection of oscillograms G and N. That fact, plus other circuit and environmental condition variables, sometimes makes it difficult to determine whether the magnitude of the sample taken at time T1 is increasing to indicate the presence of an iron target, decreasing to indicate the presence of a high conductivity target, or is changing only in a small amount as a result of the circuit variables to indicate the presence of an intermediate conductivity metal, such as 14k gold.

As a consequence, the sampling method may be further improved by taking two samples at times T2 and T3 in the time interval between T0 and T5. The time position for this sampling at time T2 and T3 is slightly before time T1 and slightly after time T1 and in the present invention is preferably at 5.85 microseconds following T0 and 8.3 microseconds following time T0. These two sample times are alternately selected by the user by switching a manual switch between two positions.

Consequently, in operating the circuitry, the user will first use an embodiment of the invention with the metal-type selecting sample time at either T2 or T3. Upon perceiving a signal indicating a variation in sample magnitude for samples taken within the interval T0–T5, for example at T2, the user mentally notes the direction of change. The user then switches to the other sample time, for example T3, and compares the signaled direction of change to the previously noted direction. If the directions of change of the sample magnitude signaled to the user is the same in both instances, for example an increase in both instances, the user will know that a ferrous metal has been detected. Conversely, if a decrease in sample magnitude is signaled to the user for both samples taken at time T2 and time T3, the user will know that a high conductivity metal, such as silver, is being detected. However, if the direction of change is different for one sample time, for example T2, than it is for the other sample time, for example T3, the user will know that a metal of intermediate conductivity has been detected.

From the above discussion of the theory of operation of the invention, it can be seen that the invention presents a manner of measuring the effect of a change in the apparent inductance of the coil inductor, resulting from mutual coupling with the metal object. The circuit detects a signal, which is a function of the coil's apparent inductance resulting from mutual coupling between the coil and the eddy currents circulating in the metal object. The circuit then signals the direction and magnitude of change in the apparent inductance of the inductor as the probe is moved. This is done by monitoring a signal, such as coil voltage, which changes as a function of a change in apparent coil inductance.

The change in apparent coil inductance can be used to signal the type of metal for the following reasons. For buried metal objects of any conductive material, eddy currents are induced in the object when the eddy currents and the coil are mutually coupled and the coil is excited by a time changing current. The mutual coupling reduces the apparent inductance of the coil and does so as a function of the conductivity of the conductive material in the buried object. The higher the conductivity of the buried object, the more the apparent inductance of the coil is reduced.

With ferromagnetic materials although the same phenomenon is present, there is simultaneously also an additional phenomenon that the inductance is increased because of the increase in permeability resulting from the high permeability of ferromagnetic materials. Because the conductivity of ferromagnetic materials is relatively low, the effect of an increased inductance caused by the permeability of ferromagnetic materials is considerably greater than the effect of a reduced inductance caused by the mutual coupling with a conductive material. Therefore, ferromagnetic materials exhibit a net increase in apparent inductance of the coil. However, in the absence of ferromagnetic permeability, buried metal objects cause a decrease in apparent inductance and the magnitude of that decrease is indicative of the conductivity of the metal in the buried metal object. Consequently, the direction of change in apparent inductance of the coil together with the magnitude of that change can be used to signal the type of metal.

The inductors used in most prior art metal detection equipment are coils. The present invention includes the use of high permeability cores for increasing the inductance of the inductor. The inductor preferred in the present invention is a coil with a ferrite core, such as commonly used as an unshielded RF choke on printed circuit boards. The axis of the inductor is preferably parallel to the axis of the probe. A distinct and advantageous feature of the present invention is to provide a radially asymmetric magnetic field pattern about the inductor and therefore about the axis of the probe in order to have directional sensitivity, which can be used to detect the bearing to the buried object.

Figure 4:
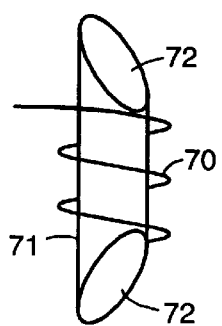
FIG. 4 is an enlarged view in side elevation of an inductor formed by a coil and ferrite core which has been contoured to provide an asymmetrical magnetic field.

FIG. 4 illustrates a coil 70 with a ferrite core 71 of the type described above, but modified by beveling its ends 72 to provide an asymmetric shape to the core. This asymmetry slightly reduces the magnetic field in one radial direction with respect to a magnetic field maximum in the diametrically opposite direction. The use as the search coil of a small, commercially available inductor of the type commonly sold for use as an RF choke or in resonant circuits provides a coil slightly greater than 1/8" in diameter and 3/4" long, thus allowing the probe diameter to be small enough for easy insertion into the soil. Although this size coil is preferred, a larger coil may be used, but the coil is preferably no larger than 1/4" in diameter so that the probe diameter will not exceed 3/8" in diameter, as previously explained.

Figure 5:
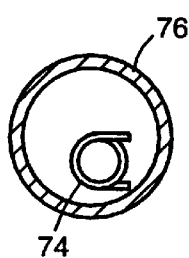
FIG. 5 is a view in horizontal section through a probe of an alternative embodiment for creating an asymmetrical magnetic field.

An alternative manner of attaining radial asymmetry of the magnetic field is illustrated in FIG. 5, in which a coil 74 is radially offset from the center of the probe 76. Each of the inductors or coils may be held in place within the chamber with a suitable epoxy.

Figure 6:
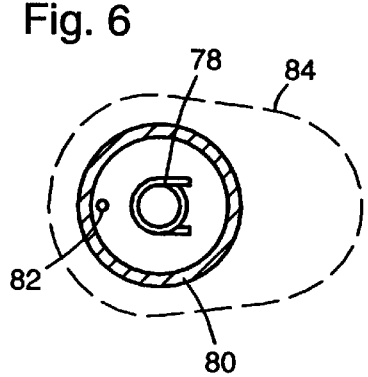
FIG. 6 is a view in horizontal section through a probe of an alternative embodiment for creating an asymmetrical magnetic field.

FIG. 6 illustrates yet another alternative manner of accomplishing the radial asymmetry. In that embodiment, the coil 78 is centrally positioned within the probe 80 but a ferromagnetic material, such as an iron bar 82 is also positioned in the probe 80 parallel to its axis. The iron bar 82 provides a low reluctance flux path so that the magnetic field radially outward from the iron bar 82 is reduced. The result is a field pattern which is asymmetric about the central axis of the probe having a major lobe 84 of maximum sensitivity extending radially outwardly from the side of the probe 80 opposite the iron bar 82.

The radial asymmetry of the magnetic field about the axis of the probe permits rotation of the entire hand tool about the axis of the probe, after the probe has been inserted into the soil, in order to cause a resulting variation in the detected signals, such as the sample magnitudes. When a buried metal object is detected, the probe is rotated until the maximum signal is received, the maximum signal corresponding to the apparent closest range to the object. The bearing from the inserted probe to the buried object is now aligned with the direction of the major lobe. That direction is marked by suitable indicia on the tool, as described above. The angular direction from the probe to the target is the bearing.

The asymmetric field pattern feature of the present invention, referred to above and described in more detail below, for providing directional sensitivity can be applied to prior art metal detection circuitry, as well as to circuitry of the present invention.

As stated above, an alternative manner of delaying or extending the decay time of the coil current is to utilize, as the resistive damper, a nonferrous, high resistivity material, in close proximity to a detecting coil. "Nonferrous" means a metal having a very low permeability. For the present invention, the permeability should be under 1.5. Such a material, for example stainless steel or titanium, has the additional advantage that it makes a probe which is stronger and harder and therefore more durable and long lasting as it is forced into hard grounds under substantial bending forces and undergoes repetitive abrasion in soil materials. Stainless steel #305 and grade 5 titanium are most preferred.

Because such a metal is nonferromagnetic, it does not shield the magnetic field from the coil. A nonferromagnetic probe material stores energy in the magnetic field generated by eddy currents induced in it and has a high resistivity permitting it to attenuate that energy, in a manner which extends the decay time of the oscillograms of FIG. 8 in the same manner as accomplished by a shunt resistance. If a metal used to construct the probe were of medium or high conductivity (low resistivity), it would extend the decay times (reduce the decay rate) by too much. Such a metal would extend the decay times beyond the time at which the eddy currents induced in the buried metal object decay to near zero, thus preventing detection of the range of the buried metal object.

The resistivity of a metal used as a probe should be 40 microohms-cm or higher and preferably more than 70 microohms-cm. For example, grade 5-titanium alloy has a resistivity of 177 microohms-cm and works well and is stronger than stainless. Grade 9 has a resistivity of about 140 microohms-cm.

Figure 9:
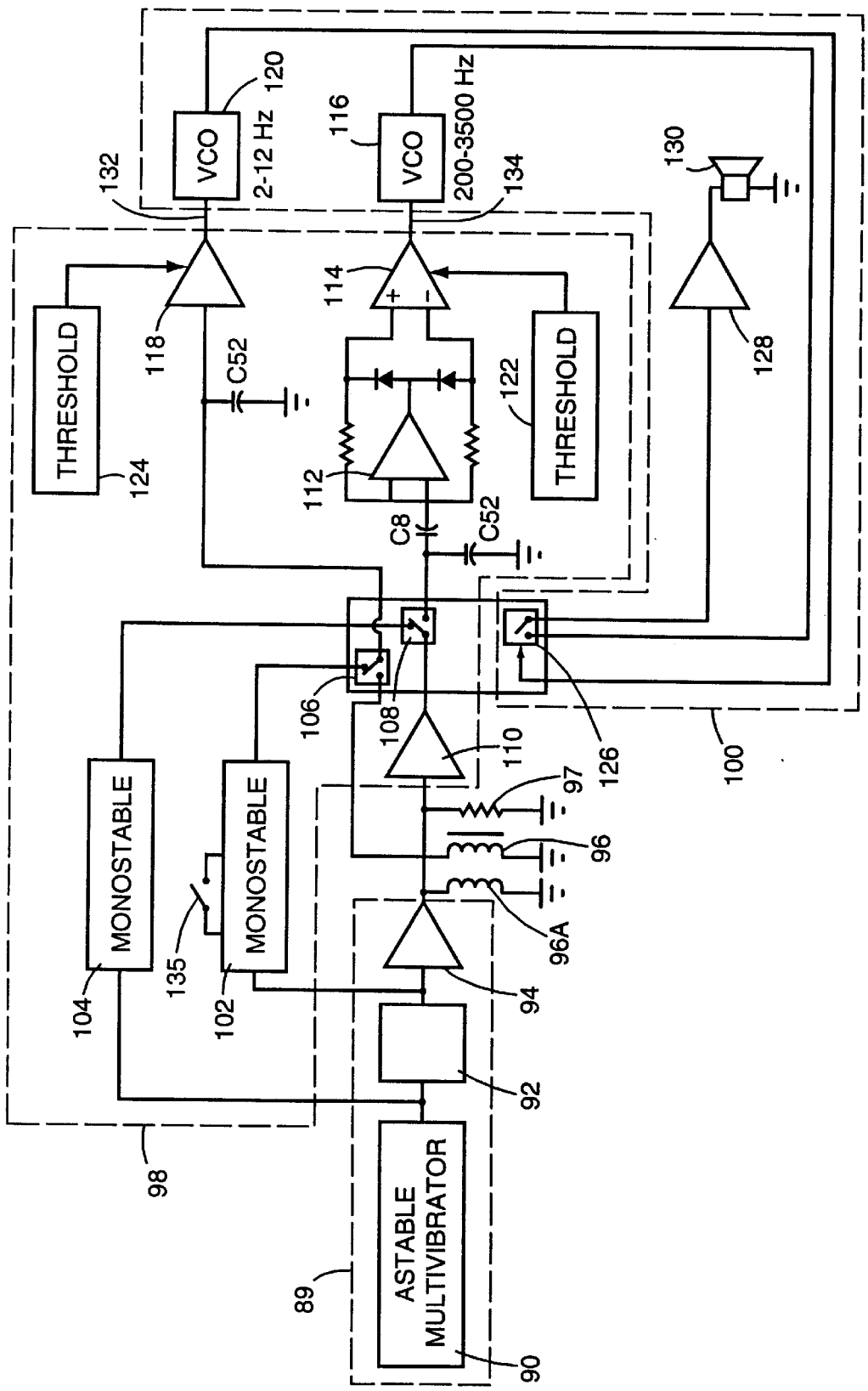
FIG. 9 is a block diagram of the preferred circuit embodying the present invention.
Figure 10:
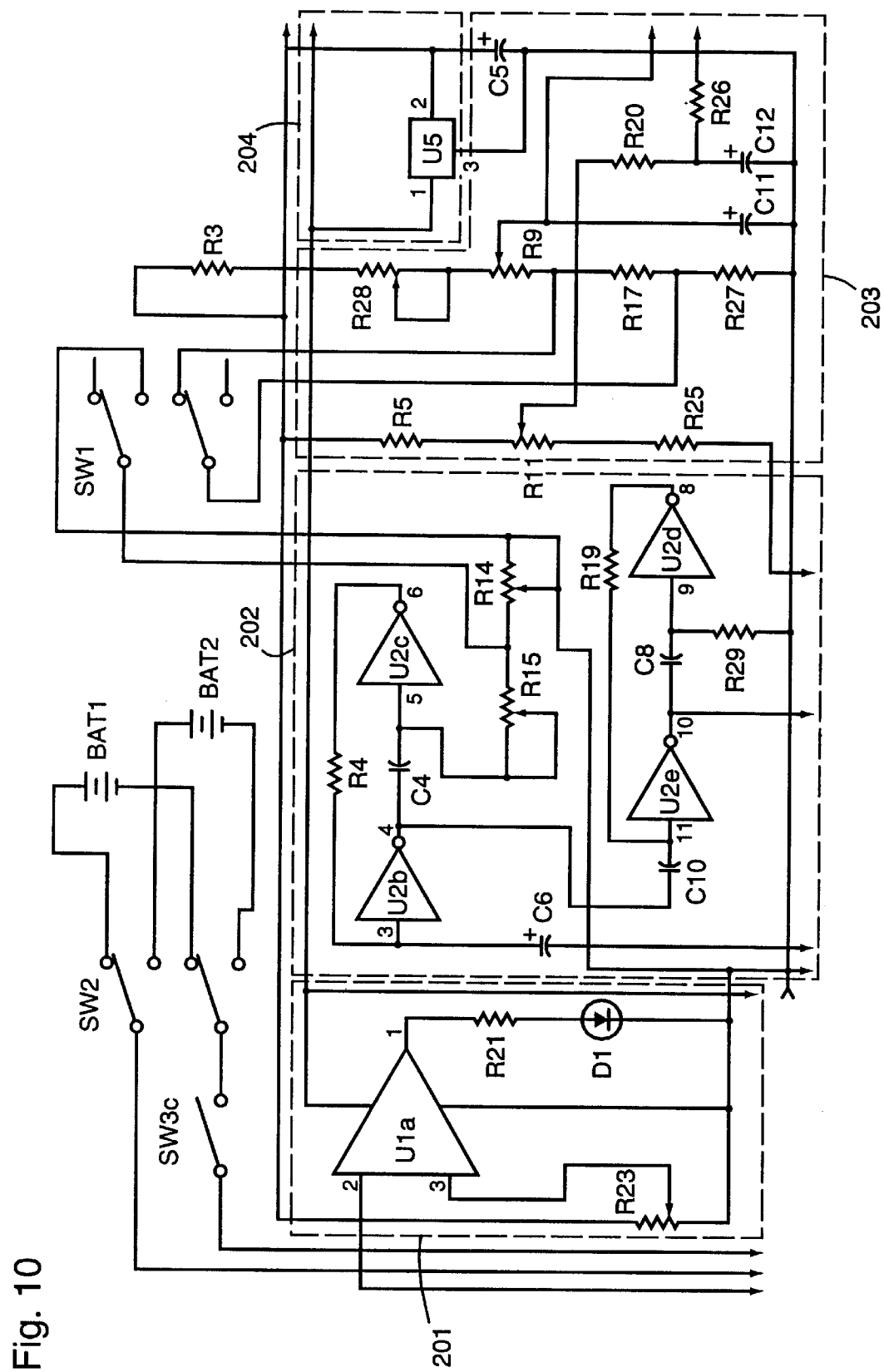
FIGS. 10–13 are schematic diagrams of the preferred embodiment of the invention, which, because of the size and detail illustrated, must be broken among several sheets, but when connected together illustrate the preferred circuit of the present invention.

FIG. 9 is a block diagram illustrating the preferred embodiment of the invention. The pulse generator 89, enclosed by dashed lines, comprises an astable, multivibrator 90, operating at 240 Hz, the output of which is applied to a divide by two flip-flop 92 to generate a 120 Hz signal, which in turn is amplified by the amplifier 94 and applied to the inductor 96. The resistive damper can be either a shunt resistance 97 or a high resistance, nonferromagnetic probe material as described above. The circuit also has a sampling circuit 98, enclosed by dashed lines, and a signaling circuit 100, also enclosed by dashed lines.

The sampling circuit 98 includes a first timing circuit 102, in the form of a monostable multivibrator, having its input connected to receive 120 Hz pulses from the flip-flop 92 of the pulse generator 89. The sampling circuit also has a second timing circuit 104, also in the form of a monostable multivibrator, having its input connected to the 240 Hz output of the astable, multivibrator 90 of the pulse generator 89. The first timing circuit 102 is connected to control a switch 106 for sampling the coil voltage within the above-described time interval for the purpose of detecting the type of metal in a buried metal target object. These samples are stored on sample storage capacitor CS2.

Similarly, the second timing circuit 104 is connected to control a sampling switch 108, for sampling the coil voltage well after the above-described time interval for detecting samples from which the presence of the buried metal object and its range can be detected.

The voltage across inductor 96 is amplified by a low-level amplifier 110, sampled by switch 108 and the sample is applied through DC blocking capacitor CB to an absolute value amplifier which is made up of a high gain amplifier 112 followed by op-amp 114.

As a result, a DC signal proportional to the range sample level sampled by switch 108 is applied through amplifiers 112 and 114 to a voltage controlled oscillator 116. The voltage controlled oscillator 116 is designed to generate an audio frequency at approximately 200 Hz for the lowest anticipated range sample magnitude and 3500 Hz for the highest anticipated range sample amplitude, with interposed range sample amplitudes generating correspondingly interposed frequencies. Obviously a different frequency range may easily be utilized.

The metal type samples stored on capacitor CS2 are applied through amplifier 118 to the input of a second voltage controlled oscillator 120. Amplifiers 114 and 118 have conventional threshold controls 122 and 124 respectively for setting the sample level below which the output of the amplifiers 114 and 118 remain at their lowest levels so that the voltage controlled oscillators 116 and 120 do not respond to them. Only sample magnitudes greater than the adjustably selected threshold values will cause an increase in the output frequency of the voltage controlled oscillators 116 and 120. This performs a squelch operation which eliminates response of the signaling circuit to noise or other meaningless low power signals.

The audio output from the voltage controlled oscillator 116 is applied through a switch 126 to an audio amplifier 128 and a speaker 130. However, the switch 126 has its control input connected to the output of the voltage controlled oscillator 120, so that it is periodically switched to alternately connect and disconnect the audio tone from the speaker at the frequency of the voltage control oscillator 120.

In the operation of the circuit of FIG. 9, the astable, multivibrator 90 applies 240 Hz pulses to the monostable, multivibrator 104 at 240 Hz and, through the divide by 2 flip-flop 92, applies 120 Hz pulses to the monostable, multivibrator timing circuit 102, as well as through the amplifier 94 to the inductor 96. The monostable, multivibrator timing circuit 102 applies a pulse of 0.5 microseconds pulse width to the switch 106, approximately 7 microseconds after termination of the 120 Hz pulse. This closes the switch 106 for 0.5 microseconds, applying a voltage sample to capacitor CS2, which is held on the capacitor CS2 for determining metal type when the switch 106 is opened. Similarly, the multivibrator timing circuit 104 applies a pulse of 5 microsecond duration to the switch 108 at approximately 34.1 microseconds after the termination of the pulse applied to the inductor 96. This causes a sample voltage to be applied through capacitor CB to the amplifier 112 for determining range.

The range samples require significant amplification by the amplifier 110 because they are taken after nearly all decay of the coil voltage has occurred. Because the amplifier 110 is a very high gain amplifier, having a gain on the order of 1,000, drift resulting from aging and temperature changes in the associated electronic components can cause a significant error in the sampling signals. Consequently, the switch 108 is switched at a 240 Hz rate, with the result that it is closed, not only during the desired sampling time at 34.1 microseconds following termination of the pulse, but also at a time before the next 120 Hz pulse is applied the inductor 96 and after the voltage on inductor 96 has decayed to essentially zero. This allows a DC level corresponding to the drift to accumulate on the capacitor CS1 so that only the magnitude of the range sample itself is coupled through the blocking capacitor CB to the amplifier 112. Those range samples are applied to the absolute value amplifier, comprising amplifiers 112 and 114, as a rectangular wave centered on zero volts. This rectangular wave has an amplitude representing the range sample magnitude and is converted to a DC level proportional to that range sample magnitude by the absolute value amplifier.

As a result, the output 132 of the sampling circuit provides a DC level corresponding to the magnitude of samples taken within the above-described time interval, the magnitude of which represents the type of metal in the buried metal object. Similarly, the output 134 of the sampling circuit 90 has a DC level corresponding to the magnitude of samples taken after the above time interval and represents the presence and range of a buried metal object.

Since the range samples at terminal 134 are applied to control the frequency of voltage control oscillator 116, the tone of the frequency emitted from the speaker 130 signals the presence and range of the buried metal object in a manner corresponding to the signal emitted from conventional metal detectors. In particular, the frequency of the tone increases as the sample magnitude increases to signal that the inductor 96 is getting closer to a buried metal object.

However, this audio tone is switched on and off at a rate which is a function of the magnitude of the metal type samples provided at output 132 of the sampling circuit 98. This very low switching rate, preferably in the range of 2–12 Hz, periodically interrupts the tone to send bursts of audio tone to the speaker 130. The user can hear that interruption rate.

Therefore, the user, before utilizing the embodiment of the invention, first sets the threshold circuit 124 to an intermediate rate between 2 and 12 Hz. As a metal object is approached, which is signaled by a change in the audible frequency from voltage controlled oscillator 116, the user can tell whether the low frequency switching rate from voltage controlled oscillator 120 increases, decreases or remains about the same. If the switching rate of voltage controlled oscillator 120 alternately switches the audio tone on and off at a reduced switching rate, the user can recognize that a highly conductive metal, such as pure gold, silver or copper, is being approached because the sample magnitude will be decreasing. Similarly, if the switching rate of the voltage controlled oscillator 120 increases, the user can perceive that the metal object being approached is a ferrous metal because the sample magnitude will be increasing.

If the alternate switching rate of the audio tone changes very little or not at all, the user will know that the metal being approached is one of intermediate conductivity, such as aluminum alloy or 14k gold.

For providing two alternatively user selectable metal type sampling times T2 and T3, as described above, monostable multivibrator 102 may simply have two, alternatively selectable timing resistances connected so either timing resistance can be switched into the circuit. This may, for example, be accomplished by using two series resistors, one of which is shunted by a manually operable switch 135, in FIG. 9, so that the series resistors exhibit one resistance when the switch is opened and a lesser resistance when the switch is closed. This is also shown in the detailed circuit of the preferred embodiment illustrated in FIGS. 10–13.

In the event a designer prefers to use a pulse induction system using two coils, the connection between the output of amplifier 94 and inductor 96 is omitted and instead a transmitting coil 96A is connected to the output of amplifier 94, as shown in phantom in FIG. 9. In that case, the inductor 96 becomes the receiving coil.

While the switches are illustrated by conventional schematic symbols, the term "switches" is used in its usual broad, electronic meaning and is not limited to mechanical switches. In fact, transistor switches or gates are preferred. Of course, as known to those skilled in the art, the switching function can be performed by computer software to accomplish the equivalent result. Similarly, as is known to those skilled in the art, the switching and sampling functions, audio signal generation, sample magnitude comparison, frequency variation and intermittent burst switching, as well as the pulse generator and sampling timing circuits, can all be equivalently performed using a suitably programmed, digital computer or microprocessor.

Turning now to the operation of an embodiment of the invention, a person using the present invention first uses a conventional metal detector to find a buried metal target object and to determine its location as precisely as is possible. An embodiment of the invention is then grasped around the handgrip and the soil is pierced as the probe is inserted down into the soil at that location. If the probe strikes a hard object and the object is metal, variations in the signals, described above, will occur as the coil located in the chamber of the probe approaches the buried object and will signal that the object is a metal target and the type of metal, as described above. If the object struck is a stone or tree root, the signals will not vary appreciably.

However, if the probe does not strike a hard object in the soil, the user then alternately raises and lowers the probe within the soil and, if the metal object is near the probe, variations in the audio frequency of the range signal can be noted. The user raises and lowers the probe seeking the maximum frequency and can then read the graduations to determine the depth below the ground surface of the buried metal object.

After determining the depth of the buried metal object, the user then rotates the tool of the present invention about the central axis of the probe to obtain a maximum audio frequency. The indicia on the probe indicating the major lobe of sensitivity then will indicate the direction the user should move the probe to again insert it into the soil. The user can use conventional geometrical locating techniques, such as those used with radio direction finders, to plot or mark a line of position for the first bearing. The probe may then be inserted a second time and the process repeated to detect a second line of position, making it likely that the buried metal object is located in the vicinity of the intersection of the two lines of position.

Additionally, the type of metal object can be detected, by noting whether the rate of the audio bursts is changing and, if so, whether it is increasing or decreasing.

Therefore, it can be seen that embodiments of the invention reduce and minimize both the number of times the ground must be pierced by the probe, as well minimizing the number of soil excavations to retrieve a buried metal object. The volume of soil which must be excavated is also minimized since the tool of the present invention provides range and bearing information with each insertion into the soil. Because the invention allows a user to determine the type of metal before the soil is disturbed, the user can exercise the option to not retrieve the object, thus reducing effort and soil disturbance. The invention enlarges the effective detection area sensed by the probe. Instead of relying solely upon physical contact which the operator can physically feel, as with conventional, inactive probes, the present invention provides range and bearing information over a larger search area. Furthermore, the present invention allows the discrimination of three types of metals, ferromagnetic metals, nonferrous, high conductivity metals and nonferrous, mid-range conductivity metals. These principles for detecting the type of metal can be applied to conventional metal detectors which detect solely above ground. The preferred embodiment of the invention ultimately provides an audible signal which is a series of bursts of an audio tone. The pitch of the audio tone indicates the presence, range and bearing of a buried metal object, while the pulse rate of the bursts indicates the metal type.

FIGS. 10–13 illustrate the details of the preferred embodiment of the invention. These details are not necessary to understand the invention, but are included to illustrate the presently preferred mode for practicing the invention. Many of the functional groups of electronic components have been framed in boxes to facilitate explanation of the operation of the circuitry. The circuit includes many additional features which do not form a part of the invention, but are included in the preferred embodiment of the invention to enhance its operation.

FIGS. 10–13 illustrate a single circuit with the figures being connected together at the connector symbols, indicated at the periphery of the circuit. Consequently, a description of the preferred embodiment of FIGS. 10–13 will be given with simultaneous reference to all of these figures. The corners of the assembled schematic have dual letters, such as UL to signify upper left, to assist in their arrangement.

The circuit is powered by battery BAT1 or a spare battery BAT2, which is alternatively selectable by double-pull, double-throw switch SW2. The power is switched on and off by switch SW3C. Block 201 provides a low battery alarm, so that when the negative power supply falls under its regulated voltage the LED D1 mounted on a control panel is turned on to signal a low battery.

Block 202 is the monostable, multivibrator timing circuit for controlling the sample timing and sample width for obtaining the metal-type identification sample. It corresponds to timing circuit 102 of FIG. 9.

Switch SW1, in conjunction with monostable, multivibrator timing resistors R14 and R15, permit the user to alternatively select the two metal-type identification sample times described above to assist the user in identifying the presence of middle conductivity metals.

In block 203, potentiometer R11 is the range, threshold pitch control and potentiometer R9 is the metal-type identification pulse rate or burst rate threshold control. The other components in block 203 adjust the sensitivity and tracking for these controls.

Block 204 has an integrated circuit regulator U5 for regulating the positive power supply voltage to 5 volts.

In block 205, the metal-type identification sample signal is amplified and applied to a voltage controlled integrated circuit oscillator U3 to generate the signal for switching the audio range tone in bursts in the manner which signals the metal type, as described above. Amplifier U4b sets the minimum burst rate (pulse rate) at which the voltage controlled oscillator can oscillate to about 2 Hz. Otherwise, a slower rate would switch the audio on and off for periods longer than two seconds, making it difficult for the user to perceive variations in the pulse rate or giving the appearance that the sound has stopped. The output of amplifier U4b feeds an inhibit input on the voltage controlled oscillator U3, holding it off until an acceptable rate signal is achieved. The switch SW4e in series with resistor R66 connected to amplifier U4c provides the user with an option to select a reduced sensitivity. Consequently, the switch SW4e is mounted to be accessible on the control panel of an embodiment of the present invention. This switch operates in conjunction with the switch in block 214, described below.

Block 206 is a protection circuit which protects the circuit from backwardly installed batteries. It turns on to provide a very low resistance MOSFET 220 pathway only when its gate is positive.

Block 207 is the range signal sample timer corresponding to timing circuit 104 of FIG. 9. Circuits U8b and U8c set the sample timing for the range sample after the termination of the current pulse; that is, at time T4 in FIG. 8.

Block 208 has a voltage-controlled oscillator U7, which is controlled by the magnitude of the range sample. The audio output tone from the voltage controlled oscillator U7 is applied to an audio amplifier U9 and from it to a speaker SPKR1. The inhibit input to the voltage controlled oscillator U7 is driven on and off by the output of the metal-type identification voltage control oscillator U3, so that the switching of the audio tone to provide the bursts is accomplished by transistor switching circuitry within the voltage controlled oscillator U7.

Block 209 has a switching regulator U11 with a voltage sense input on its pin 9 (FB). Diode D2 and inductor L2 step up a three volt battery to plus 7 volts, while diodes D2 and D11 take a switcher pulse through capacitor C30 and generate a minus 7 volts across capacitor C31. Op-amp U1b senses the negative supply and provides a regulating input to the switcher circuit U11.

Block 210 is the astable multivibrator operating to generate the pulses for pulsing the coil and corresponds to astable multivibrator 90 in FIG. 9. The integrated circuit U13 forming the astable multivibrator generates pulses at 240 Hz, as described above. Each pulse therefore has a duration of 160 microseconds.

Block 211 includes integrated circuit U12 and corresponds to the divide-by-two, flip-flop 92 described in connection with FIG. 9. The output of the divide-by-two circuit U12 is fed to a clamping MOSFET Q3. The MOSFET Q3 holds the gate of the output MOSFET Q2 at ground potential every other timing cycle. This provides an operating cycle that alternates between a sample-representing eddy current from a target and a sample representing no eddy current. This difference is used in block 216 to eliminate the effects of DC drift in the low-level amplifier U14, as described above. Block 212 provides a resistor network which adds a small component of the square wave output of integrated circuit U12 to the low level input to integrated circuit U14. This bias assures that the approach to a target always results in an increasing signal, instead of a slight decrease followed by a large increase. This is because the residual, no-eddy-current signal can be a slight residual over the target-signal that the absolute value detector (U4b and U4a in block 216) will see in error as a positive target signal.

In block 213, the inductor L1 is the search inductor and corresponds to the inductor 96 of FIG. 9. It is the main coil. Resistor R65 and potentiometer R41 provide the resistive damper, described above, in a variable or adjustable manner. Diodes D5 and D6 provide the voltage clamp for the high voltage of the coil spike for protecting the circuit elements, as described above.

Block 214 is a low-level amplifier using op-amp U14. It is necessary that it have an extremely fast response time in order to recover from the overload caused by the voltage spikes which appear on the coil. Switch SW4d provides a lower gain setting and operates in conjunction with switch SW4a in block 205.

Integrated circuit U10 is the high speed-sampling switch described above, although only two of its four switching sections are used.

Block 216 uses integrated circuit U6a to buffer the range sample stored on range sampling capacitor C32. The range signal is a square wave at about 120 Hz as a result of the on/off action of the divide-by-two circuit in block 211. The difference between the high and low square wave levels is a function of the signal strength from a metal target. The DC component is still present on pin 1 of integrated circuit U6a, but it is removed after passing through capacitor C29. Integrated circuits U4b and U4a detect the absolute value of the range signal, while using diode D7 and D8 to provide a nonlinear gain adjustment to compensate for a signal that increases by a factor of 64 whenever the distance to the target is halved; that is, the signal is inversely proportional to the target distance raised to the power of 6.

Block 217 provides a regulated minus 5 volts from the minus 7 volt power supply.

Figure 11:
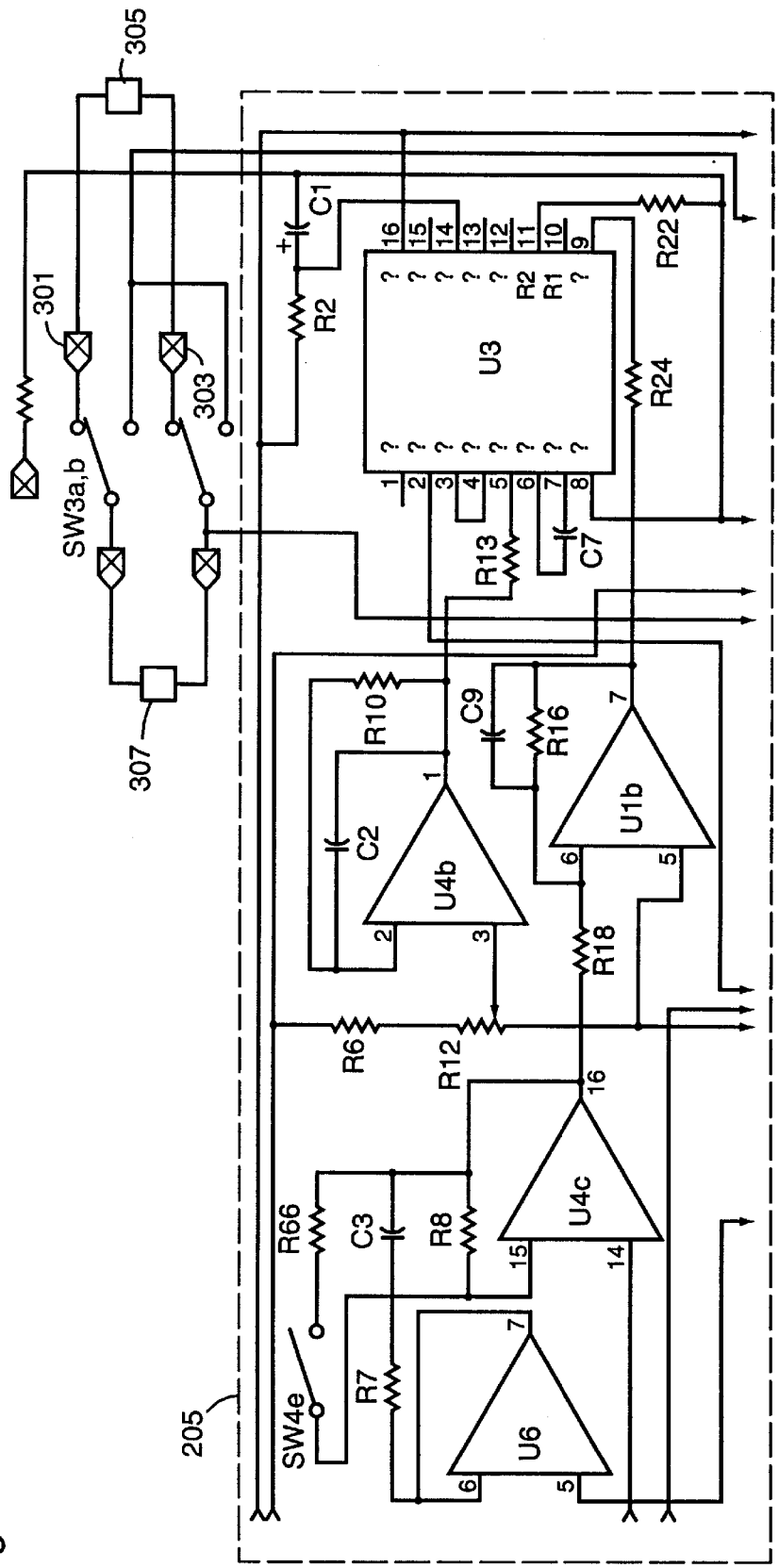
Figure 12:
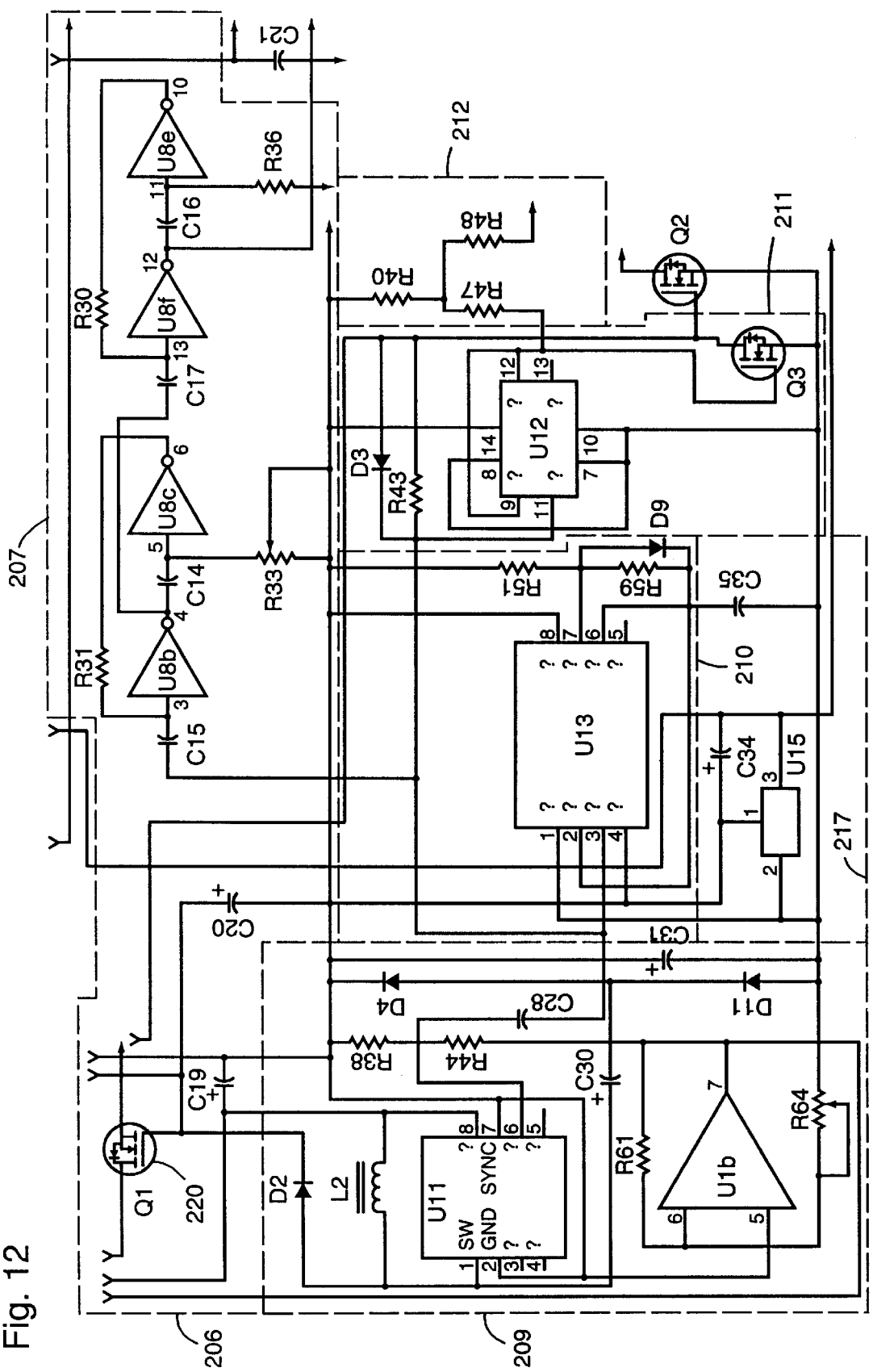
Figure 13:
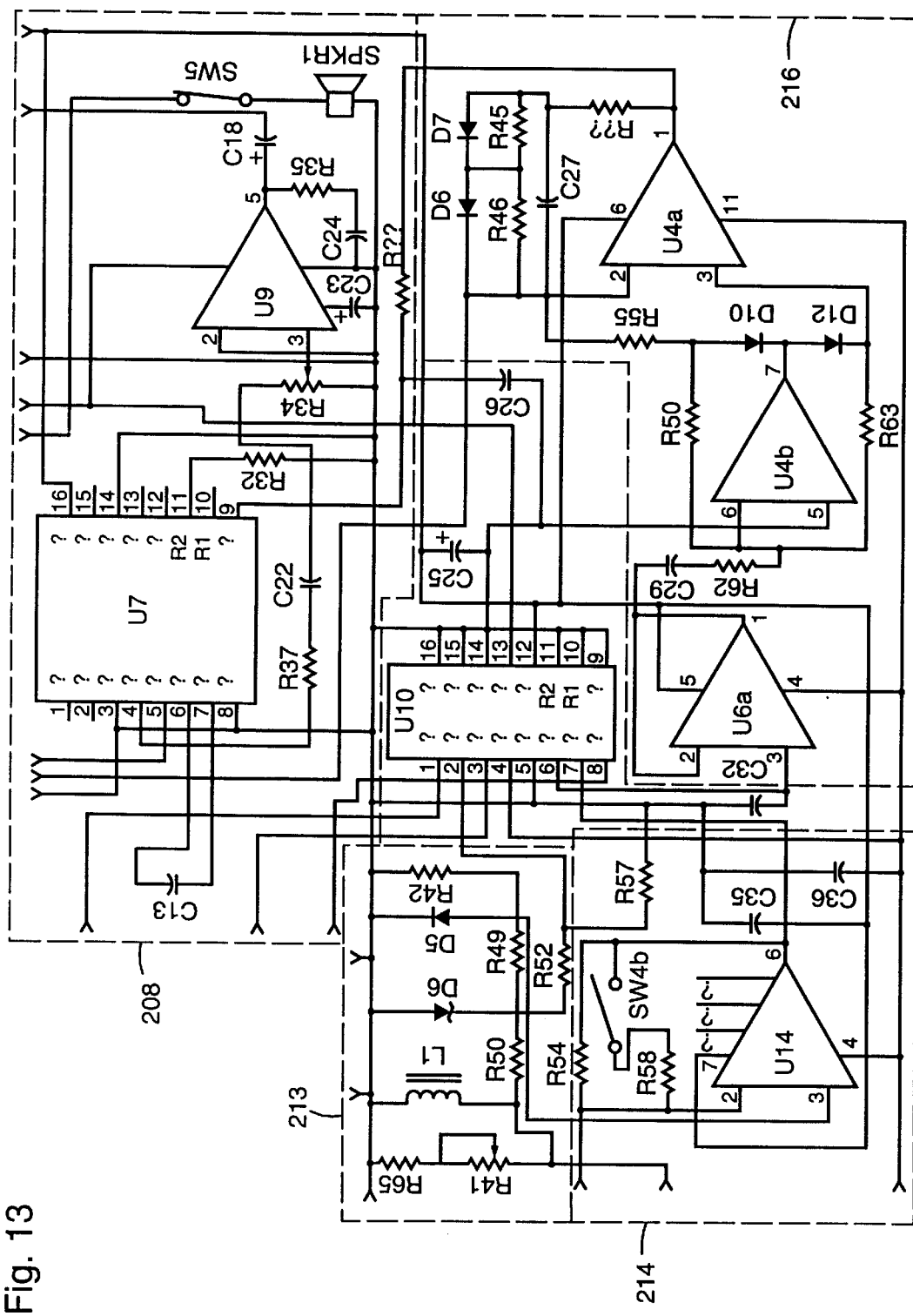

FIG. 11 also illustrates the circuitry for connecting a headset to a metal detection circuit of the present invention or alternatively to a conventional second metal detector, so that the user can use both the conventional metal detector and the embodiment of the invention without changing headsets.

A double-throw switch SW3a,b, which is preferably a double-pole sw itch for maintaining left and right channels for the above ground conventional metal detector, has input terminals 301 and 303 connected to a connector 305 for connection to the audio output of a second, conventional metal detector for connecting the audio from the conventional metal detector to a headset connector 307 when the switch SW3a,b is in the position illustrated in FIG. 11. Alternatively, when the switch SW3a,b is switched to its other position, the headset connector 307 is connected to the audio output from amplifier U9 in the block 208. Switch SW3a,b operates simultaneously with switch SW3c, illustrated in FIG. 10, to switch off battery power to the embodiment of the invention when the headset is switched into connection with a conventional metal detector.

While certain preferred embodiments of the present invention have been disclosed in detail, it is to be understood that various modifications may be adopted without departing from the spirit of the invention or scope of the following claims.

What is claimed is:

1. An improved hand tool for detecting buried metal objects, the tool having a hand grip attached to a ground piercing probe which is manually insertable into soil to displace the soil radially outwardly from the probe, wherein the improvement comprises:

(a) the probe having a chamber spaced from the hand grip for being positioned within the soil; and (b) a metal detection circuit comprising:

(i) a signal generator connected to an inductor in the chamber and generating a time varying current through the inductor for inducing eddy currents in the buried object when the probe is inserted in the soil, (ii) a detector circuit connected to an inductor in the chamber for detecting current induced in the inductor by the eddy currents, and (iii) a signaling circuit connected to the detector circuit for signaling detection of current induced in the inductor connected to the detector circuit by the eddy currents.

2. A tool in accordance with claim 1 wherein the inductor connected to the signal generator is asymmetrically shaped to provide a radially asymmetric field pattern about the probe resulting from said time varying current, the field pattern having a major lobe to provide angular sensitivity.

3. A tool in accordance with claim 1 wherein the inductor connected to the signal generator is positioned radially asymmetrically in the chamber to provide a radially asymmetric field pattern about the probe resulting from said time varying current, the field pattern having a major lobe to provide angular sensitivity.

4. A tool in accordance with claim 1 wherein the circuit is a pulse induction metal detection circuit.

5. A tool in accordance with claim 4 wherein the inductor is a coil having a ferrite core.

6. A tool in accordance with claim 5 wherein the ferrite core is asymmetric about a central axis of the coil for distorting a time changing magnetic field generated by the coil into a field pattern which is radially asymmetric about the probe, said pattern having a major lobe to provide angular sensitivity.

7. A tool in accordance with claim 1 or claim 2 or claim 3 wherein the circuit is an induction balance detection circuit.

8. A tool in accordance with claim 1 wherein the probe comprises a nonferromagnetic, high resistivity metal.

9. A tool in accordance with claim 8 wherein the probe is stainless steel.

10. A tool in accordance with claim 9 wherein the probe is #304 stainless steel.

11. A tool in accordance with claim 1 wherein a portion of the probe laterally adjacent the inductor is a dielectric material and a resistance is connected in shunt across the inductor.

12. A tool in accordance with claim 11 wherein the dielectric material is a ceramic.

13. A tool in accordance with claim 12 wherein the ceramic is a zirconia probe tip.

14. A tool in accordance with claim 11 wherein the dielectric material is a metal oxide.

15. A tool in accordance with claim 14 wherein the metal oxide is sapphire.

16. A tool in accordance with claim 11 wherein the dielectric material is a glass.

17. A tool in accordance with claim 1 wherein the hand grip extends in opposite directions from an end of the probe to provide a T-shaped hand tool.

18. A tool in accordance with claim 1 wherein length graduations are formed along the probe.

19. A tool in accordance with claim 1 wherein the metal detection circuit includes a wireless communication link including a transmitter mounted to the hand tool and a sound transducer connected to a receiver.

20. A tool in accordance with claim 1 and further comprising a ferromagnetic body mounted to the probe for distorting a time changing magnetic field generated by the inductor connected to the signal generator into a field pattern which is radially asymmetric about the probe resulting from said time varying current, said pattern having a major lobe to provide angular sensitivity.

21. A tool in accordance with claim 20 wherein a direction pointing indicium is formed on the handgrip indicating the direction of said major lobe.

22. A tool in accordance with claim 1 wherein the circuit is a pulse induction metal detection circuit, the inductor is a coil having a ferrite core and the probe is stainless steel.

23. A tool in accordance with claim 1 wherein the circuit is a pulse induction metal detection circuit, the inductor is a coil having a ferrite core and the probe tip is titanium.

24. A tool in accordance with claim 1 wherein the circuit is a pulse induction metal detection circuit, the inductor is a coil having a ferrite core and a resistance connected in shunt across the coil and the probe laterally adjacent to the coil is a dielectric material.

25. A tool in accordance with claim 22 or 23 or 24 wherein the ferrite core is asymmetric about a central axis of the coil for distorting a time changing magnetic field generated by the coil into a field pattern which is radially asymmetric about the probe, said pattern having a major lobe to provide angular sensitivity.

26. A tool in accordance with claim 25 wherein a direction pointing indicium is formed on the handgrip indicating the direction of said major lobe.

27. A tool in accordance with claim 26 wherein the metal detection circuit includes a wireless communication link including a transmitter mounted to the hand tool and a sound transducer connected to a receiver.

28. A tool in accordance with claim 27 wherein length graduations are formed along the probe.

29. A tool in accordance with claim 28 wherein the hand grip extends in opposite directions from an end of the probe to provide a T-shaped hand tool.

30. A tool in accordance with claim 1 wherein the tool further comprises a double throw switch and a headset connector connected to an output of the switch, the switch having an input connected to said metal detection circuit and an input connected to a second connector for connection to a second, above ground metal detector, the switch alternatively connecting the headset to the hand tool metal detection circuit and the second metal detector.

31. A tool in accordance with claim 1 wherein the probe has a diameter less than ⅜ inch.

32. A tool in accordance with claim 31 wherein the coil has a diameter not exceeding substantially ¼ inch.

33. A hand tool in accordance with claim 1 and further comprising:
   (a) an inductance detector connected to the inductor for detecting a signal which varies as a function of changes in the apparent inductance of the inductor; and
   (b) a signaling circuit connected to the inductance detector for signaling the direction and magnitude of change in the apparent inductance of the inductor as the probe is moved.

* * * * *